(12) United States Patent
Klausner et al.

(10) Patent No.: US 7,019,623 B2
(45) Date of Patent: Mar. 28, 2006

(54) METHOD FOR DETECTING THE POSITION OF HANDS ON A STEERING WHEEL

(75) Inventors: Markus Klausner, Wexford, PA (US); Wolfgang Grimm, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 10/297,415

(22) PCT Filed: Jun. 1, 2001

(86) PCT No.: PCT/DE01/02067

§ 371 (c)(1),
(2), (4) Date: May 9, 2003

(87) PCT Pub. No.: WO01/94188

PCT Pub. Date: Dec. 13, 2001

(65) Prior Publication Data

US 2003/0189493 A1    Oct. 9, 2003

(30) Foreign Application Priority Data

Jun. 6, 2002 (DE) .................................. 100 27 922

(51) Int. Cl.
   *B60Q 1/00*    (2006.01)

(52) U.S. Cl. .................... 340/425.5; 340/575; 340/576; 340/438; 340/902; 340/545.4; 340/686.1

(58) Field of Classification Search ............. 340/425.5, 340/575, 576, 438, 902, 545.4, 686.1
See application file for complete search history.

(56) References Cited

U.S. PATENT DOCUMENTS

| | | | | |
|---|---|---|---|---|
| 3,585,626 | A | * | 6/1971 | Tartarini ...................... 180/272 |
| 4,210,905 | A | * | 7/1980 | Coons ......................... 340/575 |
| 4,259,665 | A | * | 3/1981 | Manning ..................... 340/575 |
| 4,706,072 | A | | 11/1987 | Ikeyama |
| 5,453,929 | A | * | 9/1995 | Stove ............................ 701/1 |

FOREIGN PATENT DOCUMENTS

| | | |
|---|---|---|
| DE | 34 43 644 A | 6/1985 |
| DE | 42 00 642 A1 | 7/1993 |
| DE | 197 53 160 C | 4/1999 |
| EP | 0 545 497 A | 6/1993 |
| EP | 0 924 123 A | 6/1999 |
| JP | 55-160622 | 12/1980 |
| JP | 6-156114 | 6/1994 |
| WO | WO 99/60531 | 11/1966 |

OTHER PUBLICATIONS

US 4,706,072 is the English equivalent of DE 34 43 644A.

* cited by examiner

*Primary Examiner*—Daniel Wu
*Assistant Examiner*—Tai T. Nguyen
(74) *Attorney, Agent, or Firm*—Baker & Daniels LLP

(57) ABSTRACT

A steering wheel for a vehicle which includes sensors. The sensors are distributed into numerous segments and thus enable the position of an operator's hands on the steering wheel to be detected with high local resolution. The signals supplied by the sensors are analyzed and makes it possible to detect the position of the hands, and the maximum possible steering angle that can be set at the steering wheel without changing the grip. Control actions and control signals can be derived from this information by means of a control.

4 Claims, 4 Drawing Sheets

| Left hand | Right hand | Maximum angle of rotation to the right | Maximum angle of rotation to the left | Maximum steering torque, left | Maximum steering torque, right |
|---|---|---|---|---|---|
| VIII | II | + max, VIII-II | - max, VIII-II | $-M_{max}$, VIII-II | $+M_{max}$, VIII-II |
| VIII | III | + max, VIII-III | - max, VIII-III | $-M_{max}$, VIII-III | $+M_{max}$, VIII-III |
| VIII | IV | + max, VIII-IV | - max, VIII-IV | $-M_{max}$, VIII-IV | $+M_{max}$, VIII-IV |
| ⋮ | ⋮ | ⋮ | ⋮ | ⋮ | ⋮ |
| I | II | + max, I-II | - max, I-II | $-M_{max}$, I-II | $+M_{max}$, I-II |
| I | III | + max, I-III | - max, I-III | $-M_{max}$, I-III | $+M_{max}$, I-III |
| ⋮ | ⋮ | ⋮ | ⋮ | ⋮ | ⋮ |
| | | | | | |
| | | | | | |

Fig. 4

METHOD FOR DETECTING THE POSITION OF HANDS ON A STEERING WHEEL

BACKGROUND OF THE INVENTION

The invention relates to a steering wheel comprising sensors, a method for detecting the position of hands on a steering wheel, and a control.

It is known from JP 4183439 A1 and JP 5345569 to detect and analyze the touching of a motor-vehicle steering wheel.

In JP 4183439 A1, it is disclosed to take an electrocardiogram by means of electrodes mounted on the steering wheel. By analysis of the electrocardiogram, flagging attention or dozing on the part of the driver can be detected.

According to JP 5345569, a pressure force on the steering wheel is measured with the goal of obtaining data on the steering before the driver steers, so as to improve the response of the vehicle.

With the continued development of motor vehicles in terms of accident prevention, handling characteristics, comfort and other factors, the detection of driver behavior is becoming increasingly important.

The object of the invention is to provide an independent parameter of driver behavior in order to increase the redundancy of safety-related systems, such as electronic steering systems (steer-by-wire) or active driving-stability control systems, for example, and to permit additional plausibility checks and the outputting of any necessary warning signals to the driver. Furthermore, the functionalities of other electronic subsystems of the vehicle are to be broadened and improved by the additional independent parameter.

SUMMARY OF THE INVENTION

This object is accomplished according to the invention by means of a steering wheel for a vehicle, comprising a steering ring, a hub, and at least one spoke connecting the steering ring and the hub, wherein sensors are present on the steering ring and are arranged distributed over the periphery thereof. The sensors extend over the entire length of the steering ring, and the sensors are divided into plural segments arranged successively in the longitudinal direction of the steering ring.

With the steering wheel according to the invention, the position of the driver's hands can be reliably detected and with sufficiently high local resolution. The position of the driver's hands is a very important independent parameter of driver behavior, since nearly all potentially critical driving situations are associated with activities of the driver's hands. Therefore, analyzing the positions of the driver's hands can, among other things, markedly improve the safety of the vehicle.

In variants of the invention, two or three sensors are arranged, offset by about 180° or 120°, on the periphery of the steering wheel, so that the detection of the hands and their position on the steering ring is further improved by the ability to distinguish between the thumb and the other fingers of the hand.

As a further complement to the invention, it is provided that the segments of the sensors in the longitudinal direction of the steering ring are shorter than one finger width, and that the distance between two segments of the sensors in the longitudinal direction of the steering ring is smaller than one finger width, so that the thumb and the other fingers of the hand can be distinguished reliably from one another and high local resolution is achieved.

Further variants of the invention provide that the sensors are resistively, capacitively or inductively operating sensors, so that such prior art sensors can be used for the steering wheel of the invention.

The object stated hereinabove is also accomplished by means of a method for detecting the position of hands on a steering wheel, wherein the segments of the sensors are numbered,
the segments that are being affected by the hand or hands touching the steering ring are detected, and
the position of the hand or hands on the steering wheel are determined from the number of segments being affected by the hands touching the steering ring, according to the following rules:

If the segments are increasingly numbered in the clockwise direction,
a) the number of the segment being touched by the thumb of the left hand is higher than the lowest number of the segment still being touched by the opposite fingers, when the fingers are touching the sensor arranged on the outside of the steering ring,
b) the number of the segment being touched by the thumb of the left hand is always lower than the highest number of the segment still being touched by the opposite fingers when the fingers are touching the sensor arranged on the inside of the steering ring,
c) the number of the segment being touched by the thumb of the right hand is always lower than the highest number of the segment still being touched by the opposite fingers when the fingers are touching the sensor arranged on the outside of the steering ring,
d) the number of the segment being touched by the thumb of the right hand is always higher than the lowest number of the segment still being touched by the opposite fingers when the fingers are touching the sensor arranged on the inside of the steering ring.

With this method, the position of the hands on the steering ring can be detected reliably, simply and with high security against erroneous results. An independent parameter is thereby provided for checking the measured steering angle (driver intention) and for active control of driving stability, including actions performed on the steering angle. In addition, changes between hand-position patterns can be used to make predictions regarding driver actions that further increase driving safety.

Furthermore, the position of the hands on the steering wheel can be used as an input variable for the following functions:

warning the driver when he has only one hand or no hands on the steering wheel,
documenting the position of the hands and correlating this information with accident-related data (accident data recorder),
identifying drivers by determining driver-specific positions of the hands on the steering wheel, which can be assigned to trained patterns for drivers. In this way, the vehicle can be adapted to drivers on an individual basis, a log can be kept automatically, and theft protection can be improved. Drivers can also be recognized by measuring the electrical capacitance of the driver.

In addition, the stored data can be used for ergonometric studies of the steering operation, etc.

As a further complement to the method of the invention, it is provided that the steering ring in its current position is divided into plural quadrants; that the positions of the hands on the steering ring are each assigned to one quadrant; and that depending on this assignment, the maximum possible steering angle and/or the maximum steering torque which can be attained without changing the grip is determined, thus providing a means for independent testing of the steering-wheel sensors of steer-by-wire systems.

Further, it can be determined whether the driver is able to specify a steering angle, and if necessary an active intervention or a warning in the event of a dangerous hand position can be output, depending on the driving condition (such as road speed, visibility, etc.) detected by existing sensorics.

By comparing the maximum steering torque that can be applied by the driver with his hands in their current position to the necessary steering torque determined by means of sensorics (environmental sensorics, rotation-speed sensors), it can be determined whether it is possible for the driver to specify a control input for the steering angle.

Further complements to the method provide that the time evolution of the positions of the hands on the steering ring is determined, and/or that the time evolution of the positions of the hands on the steering ring is correlated with information concerning accident-related data, so that an accident can be analyzed and any options for improvement recognized. The information on an accident can come from an accident data recorder, for example.

In a further embodiment of the method, the determined data are stored, so that the data can be used, for example, by an electronic log, an accident data recorder, a theft protection system, an active steering system and/or a driving-stability control system.

A variant of the invention provides that the operation of the steering-angle sensors of the vehicle steering system is checked against the positions of the hands, and a warning device, particularly an acoustic warning device, is activated if necessary, thus permitting independent checking of the steering-wheel sensors for malfunctions and thus increasing the operational reliability of the steering system.

In other embodiments of the method, the time evolution of the positions of the hands is stored and assigned to individual drivers, the driver is identified by comparing the stored time evolutions of the positions of the hands with the currently determined time evolution of the positions of the hands, and/or, after the driver has been identified, vehicle parameters such as the shift program of the automatic transmission, the mirror adjustment and the driver's-seat adjustment are adapted, thereby further increasing the drive safety and comfort of the vehicle.

As a further complement to the method, reactions of the driver are ascertained in advance by means of the determined data, so that the vehicle implements the driver's reactions in an ideal manner. For example, when a hazardous situation is recognized, the torque assistance provided by the power steering can be changed.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 4 is a table for determining the maximum steering angle and maximum steering torque.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
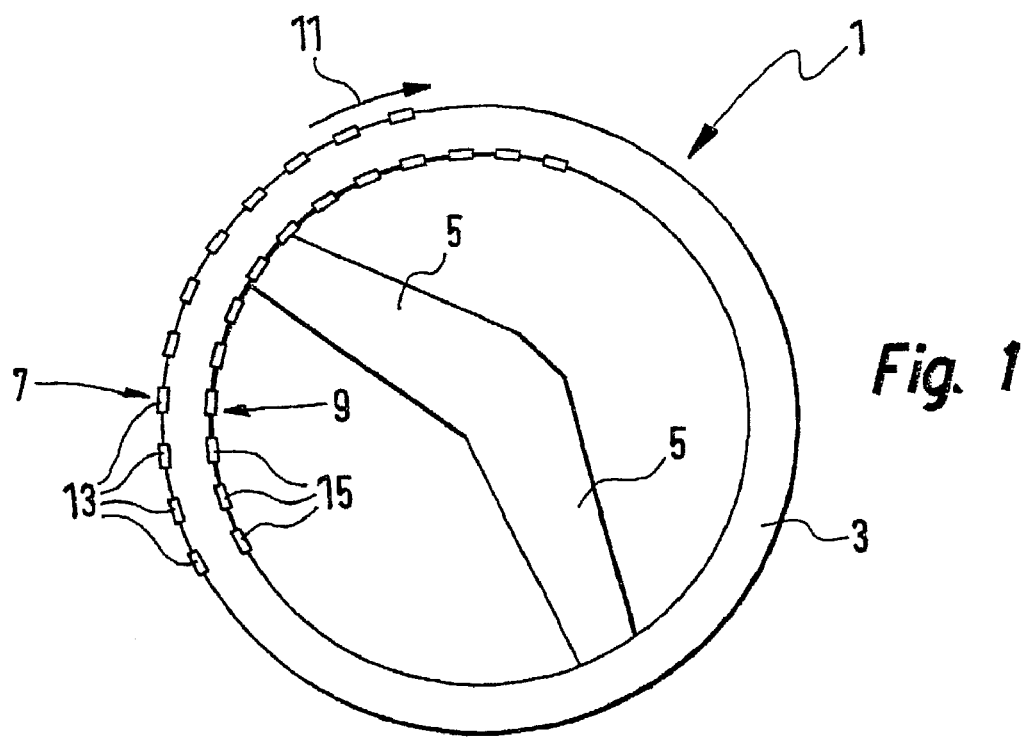
FIG. 1 is an exemplary embodiment of a steering wheel according to the invention.
Figure 6:
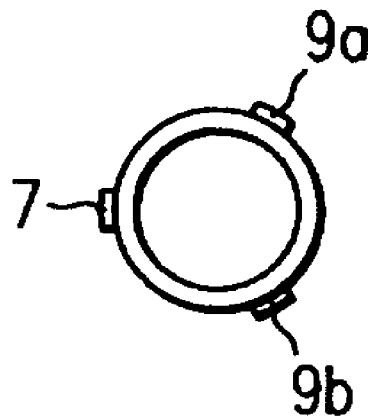
FIG. 6 is a cross sectional view of an alternative embodiment of a steering wheel showing three sensor segments spaced 120° apart.

FIG. 1 illustrates a steering wheel 1 in simplified form. It comprises a steering ring 3, a hub (not shown) and two spokes 5. Mounted on the steering ring are two sensors 7 and 9. Sensors 7 and 9 are so arranged on the periphery of the cross section of the steering ring as to be offset from each other by about 180°, and extend in the longitudinal direction 11 over the entire length of steering ring 3. There can also be provided, for example, three sensors arranged offset by 120° as shown in FIG. 6. Sensors 7 and 9 are divided into plural segments 13 and 15. For purposes of clarity, not all the segments 13 and 15 are shown in FIG. 1. It is advantageous, as illustrated in FIG. 1 for one section of steering ring 3, to mount one sensor 9 on the inside of the steering ring and another sensor 7 on the outside of the steering ring. Sensors 7 and 9 can be film pressure sensors, capacitive sensors, electrode pairs or other contact sensorics.

In order to distinguish unequivocally between the left and the right hand and to determine the gripping position, sensor segments 13 and 15 are smaller than a finger width. The distance between two segments 13 in the longitudinal direction 11 and two segments 15 in the longitudinal direction 11 is much smaller than a finger width.

Figure 5:
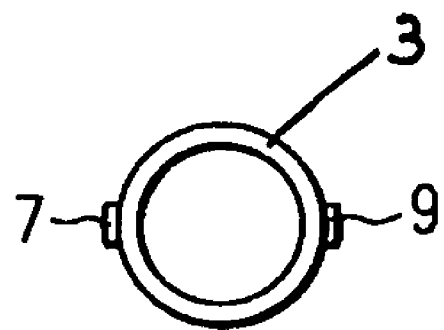
FIG. 5 is a cross sectional view of the steering wheel of FIG. 1 taken along line 5—5 thereof.

FIG. 5 shows a cross section of the steering wheel of FIG. 1. Sensor segments 13 and 15 are shown separated by 180° and located on opposite sides of the steering wheel. FIG. 6 shows an alternative embodiment in which sensor segments 13, 15, and 15b are offset from each other by 120°.

The number of segments 13 and 15 in which both sensors 7 and 9 are touched can be used to distinguish between the thumb and the fingers of a hand. The thumb touches no more than two segments 13 or 15, whereas the fingers on the opposite side together touch at least three segments 15 or 13, even when there are only two fingers grasping the wheel. If the sensors are arranged offset by 180°, at a given instant the thumb of one hand will always be touching only one or neither of the two sensor fields. The distinction between the left and the right hand is made via the relative position of the thumb with respect to the flat of the hand or fingers. The rule here is that when the steering wheel is grasped, the thumb of the left hand is to the right of the little finger and the thumb of the right hand must be to the left of the little finger. If the individual segments are increasingly numbered in the clockwise direction, then the number of the segment 15 being touched by the thumb of the left hand is higher than the lowest number of the segment 13 still being touched by the opposite fingers, when the fingers are touching the sensor 7 mounted on the outside of the steering wheel, the number of the segment 13 being touched by the thumb of the left hand is always lower than the highest number of the segment 15 still being touched by the opposite fingers, when the fingers are touching the sensor 9 mounted on the inside of the steering wheel, the number of the segment 15 being touched by the thumb of the right hand is always lower than the highest number of the segment 13 still being touched by the opposite fingers, when the fingers are touching the sensor 7 mounted on the outside of the steering wheel, the number of the segment 13 being touched by the thumb of the right hand is always higher than the lowest number of the segment 15 being touched by the opposite fingers, when the fingers are touching the sensor 9 mounted on the inside of the steering wheel.

These rules also apply when the fingers of one hand are touching both sensors at the same time. In this case, "opposite" refers to the sensor 7 or 9 opposite the thumb.

If the thumb is not touching the steering wheel, then an inference can be drawn from the previous position of the thumb relative to the flat of the fingers or hand. The use of past positions of the hands to identify the current position of the hands can also serve as a plausibility check.

If not all the fingers are touching the steering wheel, then the thumb can be shifted by no more than two sensor elements on the opposite side concerned.

If no hands are touching the steering wheel at a given instant, an unreliable hand position can immediately be inferred. An unreliable position can also be inferred when only one of the two sensors 7 or 9 is being touched.

In the case of three sensors offset from each other by 120°, the position determination can be made via the flat of the hand and fingers. In this case there is no need to analyze the position of the thumb.

Figure 2:
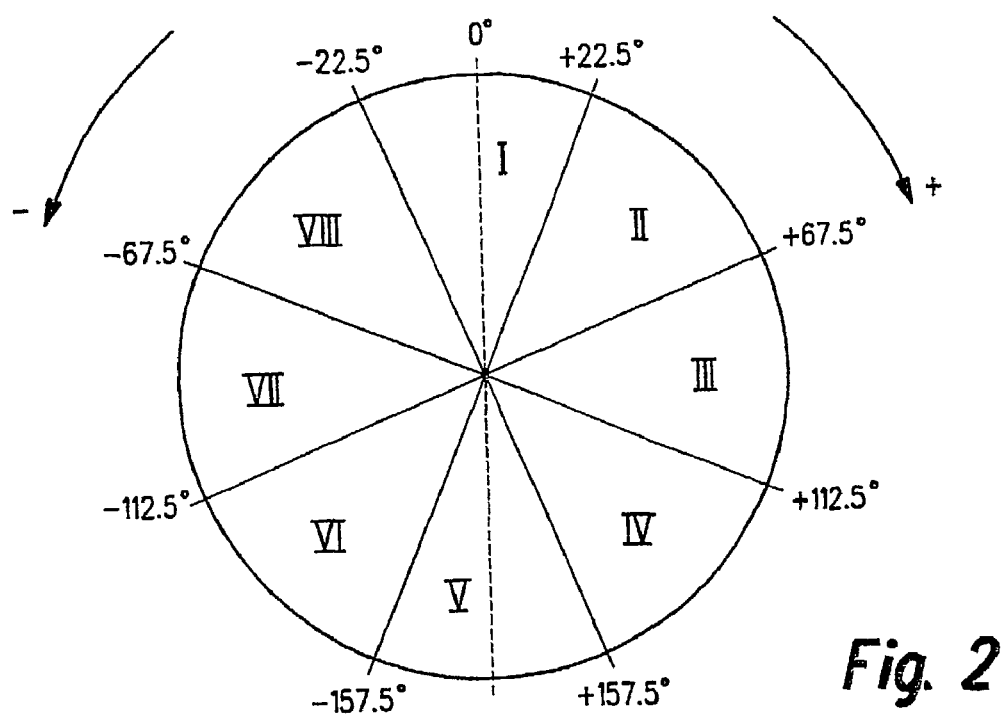
FIG. 2 shows the division into quadrants of the steering wheel of FIG. 1.

FIG. 2 shows the division of a steering wheel 1 into eight sectors I to VIII. For the duration of a partial steering operation, these sectors are invariable with respect to the local coordinate system of the steering wheel, whose origin or center is in the steering column. A partial steering operation occurs when one or both hands are shifted in relation to the steering ring 3 and a turn of the steering wheel 1 simultaneously takes place. After the end of a partial steering operation, the sectors are recomputed and reassigned on the basis of the steering-angle sensors, so that the original division into sectors with respect to the absolute reference system can be restored even when the steering wheel has been turned. However, this occurs only when the steering angle measured by the steering-angle sensor is within the maximum permissible steering angle according to FIG. 4, since the maximum-steering-angle information is used by the steering-wheel sensors as a plausibility check.

If a hand is in two sectors, it is assigned to the sector in which the greater number of segments is being touched. Each combination of positions of the hands is then assigned a maximum steering angle and a maximum steering torque to be applied. One possible assignment is shown in FIG. 4.

The positions of the hands detected by means of the steering wheel 1 of the invention and by the method of the invention can then be used, e.g., for plausibility checking of the steering-angle sensor.

Figure 3:
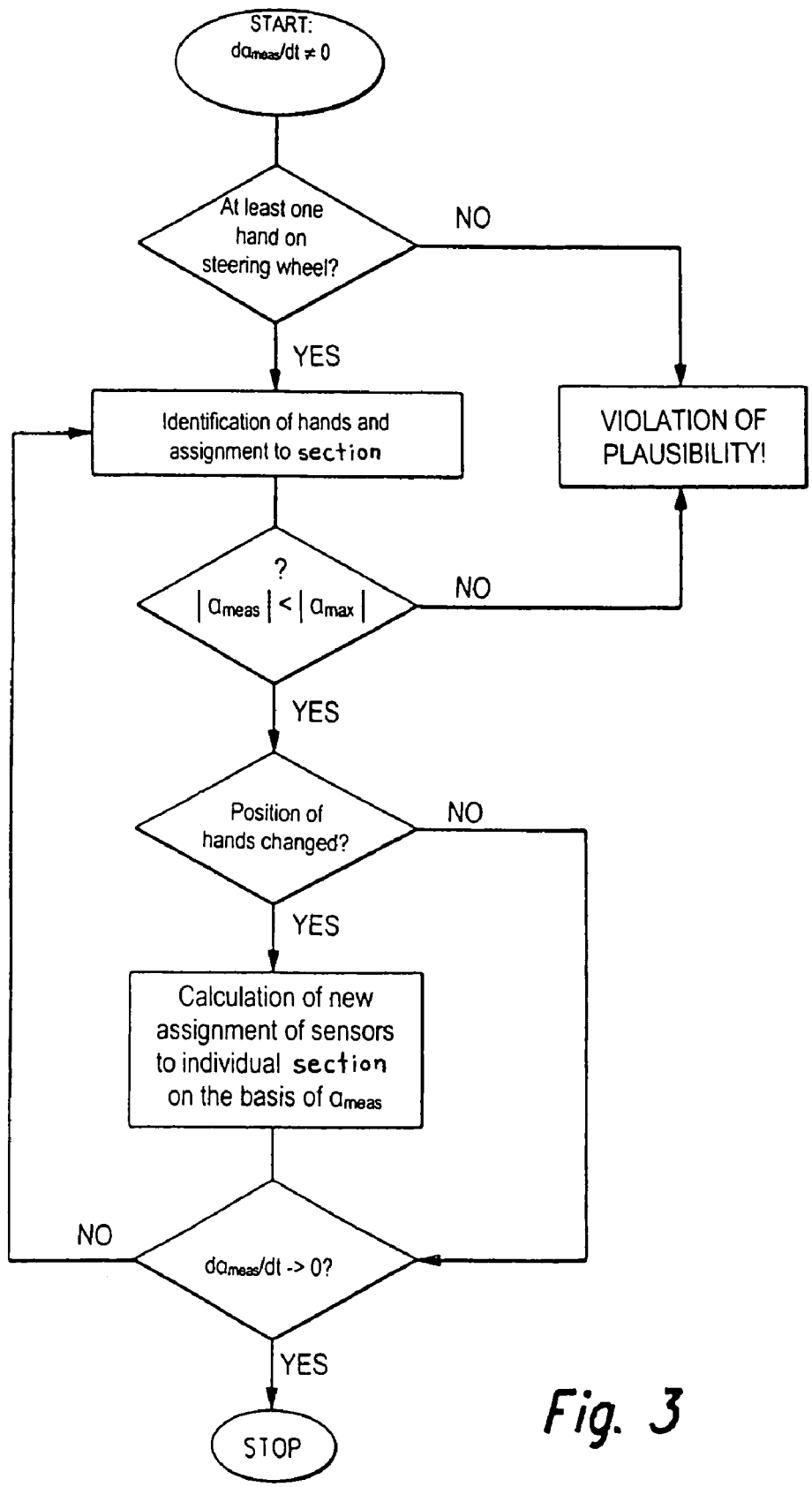
FIG. 3 is a flow chart of a plausibility check of a steering-angle sensor.

A flow chart for plausibility checking of a steering-angle sensor (not shown) is given in FIG. 3. In the chart, α denotes the steering angle measured by the steering-angle sensor.

The maximum steering torque $M_{max}$ to be applied by the driver can be compared to the necessary steering torque $M_{nominal}$ calculated from the information supplied by the environmental sensorics and/or the rotation-speed sensorics. Should $M_{max} < M_{nominal}$, a warning and/or an active correcting intervention can take place. If the sensorics used also permit measurement of the normal force between the hand and the steering wheel, the coefficient of friction can be used to perform an additional evaluation of the maximum steering torque that the driver is able to transmit to the steering wheel 1.

A further area of application of the hand-position sensorics is the prediction of driver reactions. Maneuvers such as lane changes, turns, etc. are correlated with typical behavior patterns and thus also hand-position patterns or changes in hand position. The reactions that can be expected from hand-position patterns or changes therein can be evaluated for potential hazards (e.g. collision) with the aid of further sensors such as radar distance sensors and video data. The driver can be warned in the event of danger.

If the steering wheel 1 is not being touched or is being held with only one hand while the vehicle is in motion, a warning signal could be output and/or the information stored.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A steering wheel for a vehicle whereby the position of the hands of a driver may by detected, said steering wheel comprising a steering ring, a hub, and at least one spoke connecting said steering ring and said hub, a plurality of sensors disposed on said steering ring, said sensors distributed over the periphery of said steering ring and extending over the entire length of said steering ring, said sensors comprising a plurality of sensor segments arranged in a row in the longitudinal direction of said steering ring, each said sensor segment separated from another said sensor segment by a distance which is smaller than the width of a finger, the lengths of said sensor segments being less than the width of a finger.

2. The steering wheel of claim 1 wherein said plurality of sensors comprises two sensors which are offset by 180° so that they are disposed on opposite sides of the periphery of said steering ring.

3. The steering wheel of claim 1 wherein said plurality of sensors comprises three sensors which are offset by 120° around the periphery of said steering ring.

4. The steering wheel of claim 1 wherein said sensors are one of a resistive, capacitive, and inductive type of sensors.

* * * * *